April 21, 1970   R. L. AMSTER   3,507,802

CALCIUM FLUORIDE PHOSPHORS ACTIVATED BY TERBIUM AND EUROPIUM

Filed July 19, 1967

INVENTOR.
ROBERT L. AMSTER
BY *R. J. Frank*
ATTORNEY

United States Patent Office 3,507,802
Patented Apr. 21, 1970

3,507,802
CALCIUM FLUORIDE PHOSPHORS ACTIVATED BY TERBIUM AND EUROPIUM
Robert L. Amster, Great Neck, N.Y., assignor to General Telephone & Electronics Laboratories Incorporated, a corporation of Delaware
Filed July 19, 1967, Ser. No. 654,454
Int. Cl. C09k 1/06
U.S. Cl. 252—301.4    5 Claims

ABSTRACT OF THE DISCLOSURE

A phosphor system consisting of calcium fluoride activated by divalent europium and trivalent terbium. These phosphors are photoluminescent and are suitable for use in fluorescent lamps.

BACKGROUND OF THE INVENTION

Field of the invention

This invention relates to fluorescent materials which emit light in the green region of the spectrum when excited by ultraviolet radiation. In particular, it is related to a series of phosphors comprising calcium fluoride activated by divalent europium and trivalent terbium.

Description of the prior art

Calcium fluoride activated by trivalent terbium is known to exhibit relatively weak green emission which reaches a maximum at approximately 541 nanometers when the material is excited by radiation at about 254 nanometers. Excitation of this phosphor by the 365 nanometer line results in substantially no emission. Calcium fluoride activated by divalent europium is known to emit in the blue region in a band centered at about 435 nanometers when excited by either 254 or 365 nanometer radiation. However, while the response to 365 nanometer excitation is quite strong, only a weak emission is obtained from excitation by the 254 nanometer line.

SUMMARY OF THE INVENTION

I have discovered that when divalent europium is added to trivalent terbium activated calcium fluoride the fluorescence intensity of the terbium is greatly enhanced for excitation over the entire 200 to 400 nanometer spectral region. This new phosphor system may be represented by the general formula $$(Ca_wEu_xTb_yNa_z)F_2$$

where $x$ is a quantity in the range 0.0025 to 0.06, $y$ is a quantity in the range 0.01 to 0.10, $z$ is a quantity in the range 0 to 0.10, and $w=1-(x+z+y)$.

Divalent europium has a broad absorption band in the ultraviolet region extending from 200 to 400 nanometers and much of the energy absorbed by the divalent europium is transferred to the trivalent terbium ions which then emit their characteristic fluorescence. Thus, trivalent terbium emission is sensitized by divalent europium. The strong emission in the band centered at 435 nanometers in $CaF_2:Eu^{2+}$ is largely suppressed by the addition of terbium.

Material containing no $Na^+$ yields a phosphor, $CaF_2:Eu^{2+},Tb^{3+}$, having a bright blue-green emission suitable for use in fluorescent lamps. The addition of sodium fluoride to $CaF_2:Eu^{2+},Tb^{3+}$, with resultant charge compensation of $Tb^{3+}$ by the sodium ion, leads to further suppression of the blue $Eu^{2+}$ emission. Fluorescence from this phosphor, $CaF_2:Eu^{2+},Tb^{3+},Na^+$, appears more green to the eye than $CaF_2:Eu^{2+},Tb^{3+}$ and is also suitable for fluorescent lamp application. Surprisingly, no significant photosensitization of $Tb^{3+}$ by $Eu^{2+}$ was found in related hosts such as $SrF_2$, $BaF_2$, $CaFCl$, and $BaFBr$.

DESCRIPTION OF THE PREFERRED EMBODIMENTS

Example I 0.185 gram of powdered $EuCl_3 \cdot 6 H_2O$ and 0.210 gram of $TbF_3 \cdot 0.5 H_2O$ were dry blended with 1.0 gram of $CaF_2$. The blend was placed in an alumina boat and fired in a quartz reaction tube located in a tube furnace preheated to 500° C. The firing was carried out in a hydrogen atmosphere at 1050° C. for approximately two hours. (It has been found that further heating reduces the fluorescent intensity while a shorter firing period results in incomplete incorporation of the activators.) After firing, the reaction tube is removed from the furnace and the product allowed to cool to ambient temperature while in the reducing atmosphere.

The resultant phosphor $(Ca_{0.90}Eu_{0.036}Tb_{0.064})F_2$ was excited by radiation in the range 200 to 400 nanometers. Excitation curve A of FIG. 2 was obtained by measuring the intensity of the radiation from the phosphor at 541 nanometers as the excitation wavelength was varied through the 200 to 400 nanometer range. As shown, emission was obtained over a wide range of excitation wavelengths centered at about 360 nanometers. Curve B illustrates the emission obtained from the phosphor when it was excited by radiation having a wavelength of 360 nanometers.

Figure 1:
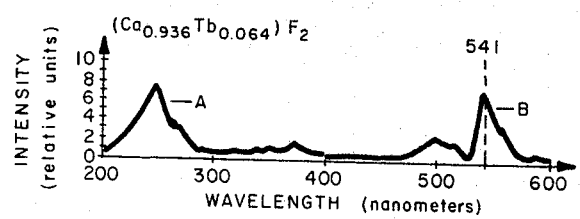
FIG. 1 illustrates the excitation and emission curves for a prior art phosphor, $CaF_2:Tb^{3+}$.
Figure 2:
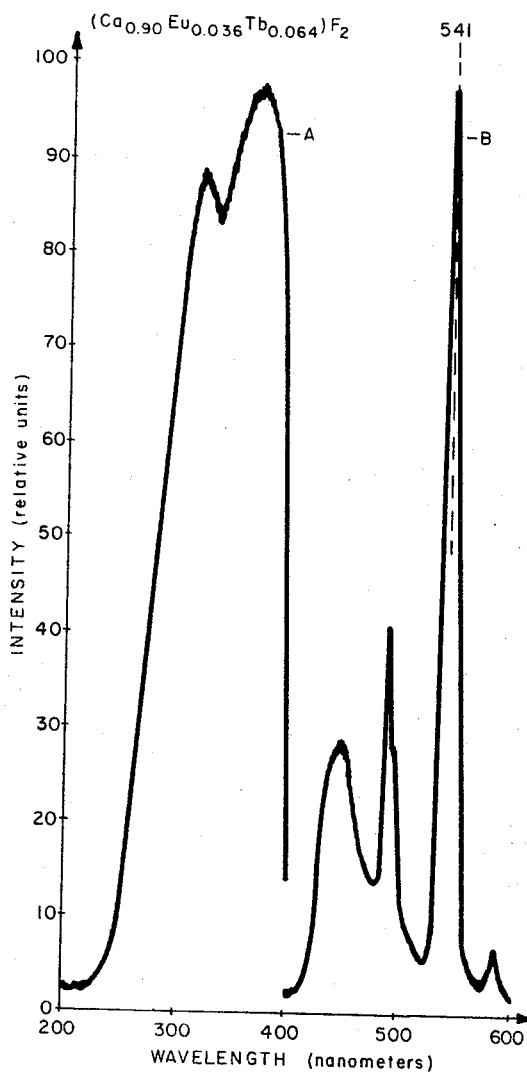
FIG. 2 shows, to the same scale as FIG. 1, the excitation and emission curves for one of the phosphors of the present invention, $CaF_2:Eu^{2+},Tb^{3+}$.

Comparison of the emission curve B of FIG. 2 for 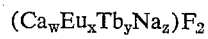$(Ca_{0.9}Eu_{0.036}Tb_{0.064})F_2$ with that of the prior art phosphor $(Ca_{0.936}Tb_{0.064})F_2$ shown at B in FIG. 1 indicates that the peak emission for both materials is obtained at 541 nanometers. However, the peak intensity of $$(Ca_{0.936}Tb_{0.064})F_2$$

is less than one tenth that obtained from the new phosphor, 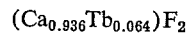$(Ca_{0.9}Eu_{0.036}Tb_{0.064})F_2$. Emission curve B of FIG. 1 was obtained by exciting $(Ca_{0.936}Tb_{0.064})F_2$ with radiation having a wavelength of 254 nanometers, the value producing maximum fluorescence at 541 nanometers.

The relative intensity of $(Ca_{0.9}Eu_{0.036}Tb_{0.064})F_2$ was also obtained by comparing it with the emission from a commercially available green-emitting phosphor, manganese activated zinc silicate, under medium and low pressure mercury lamp excitation. The results were as follows:

| Phosphor | Relative intensity | |
|---|---|---|
| | Medium pressure Hg lamp | Low pressure Hg lamp |
| $Zn_2SiO_4:Mn^{2+}$ (standard) | 29 | 100 |
| 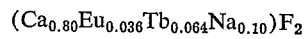$(Ca_{0.9}Eu_{0.036}Tb_{0.064})F_2$ | 100 | 20 |

Example II

Figure 3:
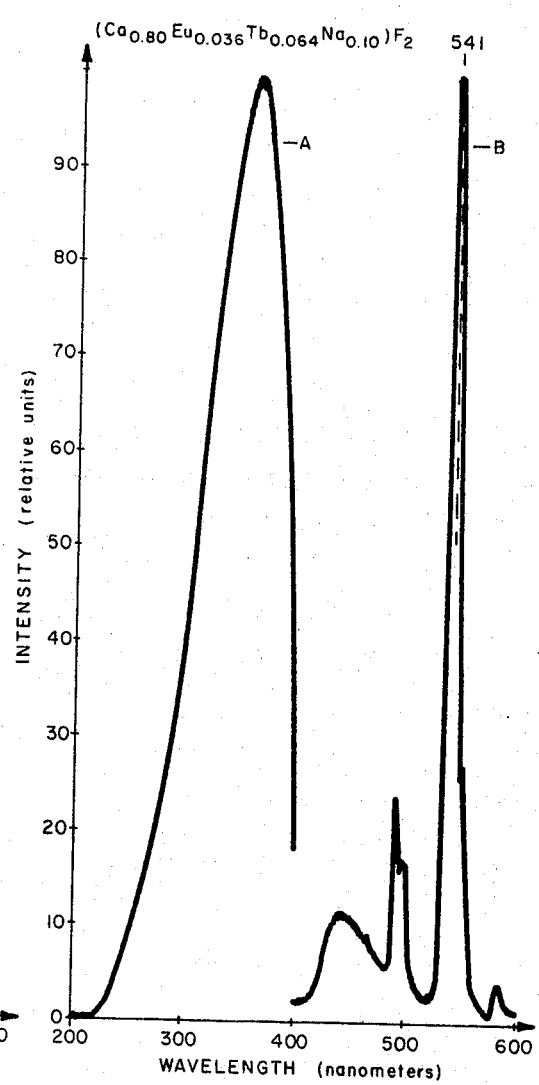
FIG. 3 shows the excitation and emission curves for another novel phosphor, $CaF_2:Eu^{2+}, Tb^{3+}, Na^+$.

A phosphor was prepared by the method of Example I except that 0.06 gram of NaF were blended with 0.185 gram of $EuCl_2 \cdot 6H_2O$, 0.210 gram of $TbF_3 \cdot 0.5H_2O$ and 0.89 gram of $CaF_2$. The resultant phosphor $$(Ca_{0.80}Eu_{0.036}Tb_{0.064}Na_{0.10})F_2$$

had a greater intensity of emission at 541 nanometers than the material without sodium and the emission at 435 nanometers corresponding to the Eu$^{2+}$ emission was nearly completely suppressed. This is shown by the excitation curve A and emission curve B of FIG. 3.

Example III

Additional samples were prepared of phosphor compositions having the general formula $(Ca_wEu_xTb_yNa_z)F_2$ in which $x$ was varied between 0.0025 and 0.06, $y$ between 0.01 and 0.10 and $z$ from 0 to 0.10. In all cases, green emitting phosphors were obtained but their intensities were somewhat less than that exhibited by the phosphors of Examples I and II.

What is claimed is:

1. A phosphor composition consisting essentially of calcium fluoride activated by 0.0025 to 0.06 divalent europium and 0.01 to 0.10 trivalent terbium.

2. The phosphor composition defined by claim 1 wherein said trivalent terbium is charge compensated by the addition of sodium.

3. A composition of matter defined by the formula $(Ca_wEu_xTb_yNa_z)F_2$ where Eu is divalent, Tb is trivalent, $x$ is a quantity in the range 0.0025 to 0.06, $y$ is a quantity in the range 0.01 to 0.10, $z$ is a quantity in the range 0 to 0.10 and $w = 1 - (x+y+z)$.

4. The composition of matter defined by claim 3 wherein $x$ equals approximately 0.036, $y$ equals approximately 0.064, and $z$ equals zero.

5. The composition of matter defined by claim 3 wherein $x$ equals approximately 0.036, $y$ equals approximately 0.064, and $z$ equals approximately 0.10.

References Cited

UNITED STATES PATENTS 3,079,347   2/1963   Garrett et al. _____ 252—301.4

OTHER REFERENCES

Kroger: Some Aspects of the Luminescence of Solids, 1948, pages 292 and 297.

TOBIAS E. LEVOW, Primary Examiner

R. D. EDMONDS, Assistant Examiner